United States Patent [19]

McKaveney

[11] 3,766,036

[45] Oct. 16, 1973

[54] PROCESS FOR THE REMOVAL OF IONIC METALLIC IMPURITIES FROM WATER

[75] Inventor: James P. McKaveney, Claremont, Calif.

[73] Assignee: Occidental Petroleum Corporation, Los Angeles, Calif.

[22] Filed: Mar. 6, 1972

[21] Appl. No.: 232,239

Related U.S. Application Data

[63] Continuation-in-part of Ser. No. 125,878, March 18, 1971, abandoned.

[52] U.S. Cl. .................................. 204/150, 210/42
[51] Int. Cl. ........................ C02b 1/82, B01d 21/00
[58] Field of Search ................... 204/130, 149, 150; 210/42

[56] References Cited
UNITED STATES PATENTS

| | | | |
|---|---|---|---|
| 1,222,637 | 4/1917 | Landreth | 204/150 |
| 2,044,888 | 6/1936 | Overdick et al. | 204/130 |
| 2,133,895 | 10/1938 | Kuhl | 204/150 |
| 2,864,750 | 12/1958 | Hughes, Jr. et al. | 204/149 |
| 2,982,608 | 5/1961 | Clement | 204/130 |
| 3,061,537 | 10/1962 | Yagishita | 204/130 |
| 3,244,605 | 4/1966 | Hotchkiss | 204/153 |
| 3,457,152 | 7/1969 | Maloney, Jr. et al. | 204/130 |

*Primary Examiner*—T. Tufariello
*Attorney*—William N. Patrick et al.

[57] ABSTRACT

This invention discloses a process for removing ionic metallic impurities from aqueous solutions by contacting said solutions with one or more selected silicon-metal alloys having an overall electrochemical potential greater than the electrochemical potential of the ionic metals in their free metal form to be removed.

35 Claims, No Drawings

PROCESS FOR THE REMOVAL OF IONIC METALLIC IMPURITIES FROM WATER

BACKGROUND OF THE INVENTION

This is a continuation-in-part of my application, Ser. No. 125,878 filed Mar. 18, 1971 and now abandoned.

The contamination of bodies and streams of water with certain ionic metallic impurities may present a serious environmental health hazard. Also, ionic metal in water sometimes renders such water unuseable in industrial applications. The art has long sought an efficient economical process for removing hazardous metal ions from water. The problem of removing such ions from water is that the ionic metal is usually present only in relatively minute quantities. Thus, the impurities are not removable by conventional chemical reaction techniques to form them into solid products which will allow them to be easily removed by physical separation means, i.e., filtration, centrifugation, etc. A further drawback in such approaches is that the cost of the reactants renders such processing prohibitive.

Others in the art have tried to use organic ion exchange resins and while such resins can be employed, the cost of the resin and their selectivity limitation render such processes impractical.

It has been proposed in the past to contact such impure water with solid particulate metals wherein the metal has an electrochemical potential greater than the electrochemical potential of the ionic metallic impurities when they are in the metallic state. The use of the electrochemical potential differential in such systems while having much merit was severely limited due to the fact that those metals having very high electrochemical potentials, i.e., calcium, barium, etc. where used alone were too reactive with water, which factor prevents the absorption of the ionic metallic impurities onto the surface of the metal employed.

It is an object of this invention to produce an efficient economical method of removing ionic metallic impurities from aqueous solutions thereof.

SUMMARY OF THE INVENTION

There has now been discovered a process for removing ionic metallic impurities from aqueous solutions thereof which comprises contacting an aqueous solution containing ionic metallic impurities with a solid particulate silicon-metal alloy; said alloy containing up to about 64.0 weight percent of silicon based upon the total weight of the alloy and the remainder of the said alloy being composed of one or more metals, the alloy having a higher electochemical potential than the metallic ionic impurities sought to be removed as compared to impurity metals when in their free metallic state. In the process, less obnoxious ions are introduced to the aqueous phase from the alloy and certain of the ions may be hydrolyzed and redeposited on the surface of the alloy.

In a preferred embodiment of this invention, the metallic alloys which can become loaded with ionic metallic impurities and are then removed from the aqueous phase, are regenerated by oxidizing the ionic metallic impurities away from the surface of the alloy particles, permitting reuse of the alloy particles in the purification portion of the system. The oxidation may be carried out by chemical and/or electrochemical means. In general, it is preferred to utilize alloys containing from about 1.0 to about 65 weight percent silicon based upon the total weight of alloy.

DETAILED DESCRIPTION OF THE INVENTION

In the practice of my invention, it must be borne in mind that the silicon present in the alloy modifies the overall electrochemical potential of the alloy and thus the alloys have a lower electrochemical potential than the pure non-silicon metals which the alloy contains. The preferred net electrochemical potential of the alloys found useable in my invention ranges between from about 0.35 volts to about 2.5 volts (values in volts referred to herein are to the hydrogen-hydrogen ion couple as zero and are for unit activities and temperature of 25° C). By the term electrochemical potential as used, it is meant the standard oxidation-reduction potential of the alloys of this invention.

The silicon based alloys can be used to remove ionic metallic impurities from aqueous solutions in the presence of other ionic impurities present in the aqueous solution which are removed to a limited degree of remain unaffected. Thus, they can be used to selectively remove ionic metallic impurities having an electrochemical potential less than the overall electrochemical potential of the silicon metal alloy employed from an aqueous solution wherein said aqueous solution retains metallic ions, which in their elemental state have a greater electrochemical potential than the silicon metal alloy. For instance, an alloy made up of iron, magnesium and silicon can be utilized to remove ionic impurities such as arsenic, copper, cadmium, lead, mercury, etc. from an aqueous solution thereof, even though said aqueous solution contains ionic metal values, i.e., potassium, sodium, which have a greater electrochemical potential than that of the alloy without removing those metal ions having the higher electrochemical potential. The process can be used to remove ionic metal impurities containing salts, i.e., sodium chloride, potassium chloride, etc. Further, it can be used to selectively remove individual ions from aqueous solutions containing mixtures of ions having varying electrochemical potentials simply by utilizing silicon-metal alloy having an overall electrochemical potential intermediate to that of the ionic metal species which are to be separated and to those left behind in the solution.

In practice, when it is desired to selectively separate a group or a particular ionic metallic species from an aqueous solution containing a mixture of ionic metallic species, all one need do is utilize a silicon-metal alloy which has an electrochemical potential intermediate to that of the species or group of species to remain and higher than the electrochemical potential of the ionic species present in the solution which have a lesser electrochemical potential than the desired species to remain; the species of lower electrochemical potential removed. Thus, a silicon-metal alloy species may be utilized which has an electrochemical potential which is intermediate between the electrochemical potential of the desired species to be removed and the electrochemical potential of the ionic metallic species to remain in the solution.

The following illustration is given to illustrate this novel feature of my invention; Column A lists a series of elements which can be removed from aqueous solution by practice of my invention and Column B lists the electrochemical potential of the element in its elemental form in volts:

| Column A | Column B |
|---|---|
| Zinc | +0.762 |
| Chromium | +0.71 |
| Iron | +0.44 |
| Cadmium | +0.40 |
| Lead | +0.126 |
| Copper | −0.345 |
| Mercury | −0.845 |

Consider, for instance, an aqueous solution containing all of said elements in the form of ionic metallic species wherein it is desirable to separate the zinc therefrom, all one need do is employ a silicon-metal alloy in my process having an electrochemical potential of less than 0.762 and greater than 0.71 to remove all of the ions beneath zinc and thereafter employing a silicon-metal alloy in my process having an electrochemical potential of less than 1.67 and greater than 0.762 to remove the zinc from the solution. It will be obvious to those skilled in the art that many different variations of such processing can be utilized to isolate specific metallic ions and groups of ionic metallic species from aqueous solutions thereof which are equivalent to and within the framework of my invention.

Among the metals that may be alloyed with silicon to provide the silicon-metal alloys of this invention, there may be mentioned barium, lithium, calcium, sodium, potassium, magnesium, cerium, lanthanum, titanium, aluminum, vanadium, manganese, zinc, chromium, iron, cobalt, tungsten, nickel, molybdenum, copper, zirconium, niobium, tin, and the like. In general, the alloy is composed of a plurality of metals to provide the electromotive potential desired for the ionic impurities to be removed from the aqueous solution containing them.

I have found, however, that when chromium is alloyed with iron and aluminum, it should be present in the silicon-metal alloys in an amount less than about 15 percent by weight; at this level their activity for mercury extraction is materially inhibited.

The silicon content of the silicon-metal alloy can be varied by a wide extent and may be present in an amount up to about 65 percent by weight, preferably from about 1.0 percent to about 65 percent by weight, more preferably from about 35 to about 65 percent by weight.

While the silicon-metal alloys found used in this invention can contain minor amounts of materials, e.g., carbon, sulfur, phosphous, nitrogen, rare earth metals, such as cerium, lanthanum, and the like, care should be taken that such materials do not introduce undesirable contamination into the aqueous solution which is being purified and do not affect the overall electrochemical potential of the alloy in an undesirable manner.

To maximize the effectiveness of the silicon-metal alloys in a separation process, effectiveness, all other factors being constant, will be increased with reduced particle size. Generally the particle size employed will range from about −325 to about 10 mesh.

My novel process can utilize any of the conventional processing techniques and equipment which are useful in contact liquids and solids. Thus, for example, the aqueous solution containing the ionic metallic impurities can be passed through a fixed or fluidized bed, wherein said bed is composed of the solid particulate silicon-metal alloys found useful in this invention. In general, I favor the use of solid particulate silicon-metal alloys having a relatively small particle size in order to enhance the degree of contact between the ionic metal impurities in the aqueous solution and the alloy particles.

The silicon-metal alloys found useable in my invention should, preferably, be substantially inert with respect to water or release metallic ions to the aqueous phase that can be separated therefrom by chemical treatment or which will hydrolyze and deposit on the surface of the alloy. The use of the silicon in the alloy modifies the chemical nature of the other metals in the alloy and allows their use as an extractant. Thus, barium and calcium which in their elemental forms react violently with water and because of such violent reaction would be unsuitable for use as in the practice of my invention can because of the presence of silicon in the alloy inhibit such reactivity.

Elemental iron when utilized by itself in contact with water forms undesirable iron oxide through reaction with dissolved oxygen in the water dispersions discoloring and contaminating the aqueous solution. Iron may be modified by alloying it with silicon and the presence of the silicon and at silicon contents greater than 1 percent by weight has been found to permit iron to leave the alloy, possibly as a scavenger, oxidize and hydrolyze and deposit on the surface of the alloy.

Care must be taken in selecting silicon-metal alloys for use in my invention to see that the alloy does not overreact with water causing undue dissolution of the alloy rendering the process uneconomical. The reactivity of the silicon-metal alloys found useable in my invention with respect to water can be checked simply by contacting the proposed silicon metal alloy with water and ascertaining rate of dissolution of the alloy in the water. The inertness of the silicon-metal alloys found useful in my invention with respect to water will in some cases be affected by the pH of the aqueous solutions which they are brought into contact with, e.g., a silicon metal alloy having the formula 20.5 weight percent aluminum, 12.4 weight percent barium, 10.6 weight percent calcium, 17.5 weight percent iron and 39.0 weight percent silicon serves as a highly efficient extractant at a pH of about 4 or greater, however, when it is employed as an extractant in aqueous solutions of lower pH value overreacts with the solution producing a combustible gas. There are many silicon-metal alloys within the scope of my invention which are compatible as an extractant to extract ionic metal impurities from aqueous solutions which are acidic or alkaline without undue dissolution of the alloy in aqueous solution.

In the practice of my process the ionic metallic impurities removed from the aqueous solution may be electrochemically bonded to the silicon-metal alloys used in the process. In this situation, to remove these ionic metallic impurities bonded to the alloys from the alloys all one need do is to separate the alloy from the aqueous solution and oxidize the ionic metal impurities from the alloys simply by contacting the alloys with an oxidizing agent such as an aqueous acid solution, e.g., dilute hydrochloric acid. An oxidizing agent, i.e., hydrogen peroxide, ammonium persulfate, etc., should be added to acid solutions when the ionic metallic impurities bonded to the alloy have an electrochemical potential lower than hydrogen in the electromotive series.

Electrochemical means can also be employed to remove the ionic metallic impurities from the alloys by utilizing the alloys having the ionic metallic impurities bonded thereto as the anode of an electrochemical cell and applying a suitable electrical potential to the cell causing the ionic metallic impurities to be removed from the alloy and recovering the regenerated alloy for reuse in the process. When utilizing electrochemical means to regenerate the alloy care must be taken to avoid dissolving the alloy into the cell solution. In general, the ionic metallic impurities bonded to the alloys will be rapidly removed from the alloy and the alloy should be removed from the cell as soon as possible in order to minimize alloy dissolution.

It will be obvious to those skilled in the art that the regeneration of the alloy can also be carried out in situ within the aqueous solution simply by isolating the alloy, carrying out the regeneration and removing the impurities from the solution. This feature can be advantageously employed in many situations, i.e., using an alloy bed as the anode of an electrochemical cell and passing the liquid of the cell through the bed to remove the impurities as they are freed from the cell surface. Any suitable cathodic material can be utilized as the cathode of the electrochemical cell.

Care should be utilized in selecting a silicon-metal alloy for use which will not add undesirable metal ions to the aqueous solution from which undesirable metal ions are being removed. The addition of ions such as iron, magnesium, calcium, barium, aluminum and titanium is tolerable in many water purification processes. Any such ions which are released into the aqueous phase can readily be removed therefrom by conventional chemical techniques where desirable, i.e., liming, alkali, sulfate addition, settling hydrolyzed metallic values for separation as such or on the surface of the alloy, or by re-extracting them using a silicon-metal alloy of greater electrochemical potential, etc.

In many instances too, the objectionable metal may be simply exchanged with a less objectionable metal such as calcium or magnesium which an aqueous solution can tolerate depending on its end use requirements.

In considering hydrolysis, it has been observed that certain alloys can reduce chromium from the hexavalent state only to the trivalent state followed by hydrolysis and deposition on the surface of the alloy.

A very important aspect of using the silicon-metal alloys for removal of ionic metallic impurities is that it is possible to metallurgically design alloy combinations that would be suitable for separating metals which are closely spaced in the electromotive series.

Further, the use of selective silicon-metal alloys can be employed to extract ionic metallic impurities on a piecemeal basis. For instance, a solution may be contacted with one silicon-metal alloy to extract one or more metals of low electrochemical potential and then with a silicon-metal alloy of higher electrochemical potential to extract metals having a higher place in the electromotive series and so forth.

The following exemplary of a partial listing of the ionic metallic impurities which can be removed from aqueous solutions: silver, arsenic, antimony, gold, cadmium, copper, chromium, bismuth, mercury, lead, selenium, tellurium, thallium, tin, and zinc. This listing is given merely as illustrative of metal ions which are removed by my novel process and is not meant to be limiting thereon.

EXAMPLES 1 to 6

Two aqueous solutions were prepared containing 25 parts per million of each of the following elements: arsenic, cadmium, copper, mercury and lead as ionic metallic impurities dissolved therein. 30 grams per liter of sodium chloride were contained in one of the solutions. 50 ml. samples of each of the solutions were placed into 250 ml. flasks, which flasks contained 50 ml. volumes of various silicon-metal alloy particles (the particles were sized so that they could pass through an 8 mesh sieve — U.S. Bureau of Standards, Standard Screen Series 1919). The flasks were then stoppered and vigorously shaken on a mechanical shaker. The treated solutions were then filtered to remove all solids therefrom and the filtrates of each sample were collected and analyzed by standard atomic absorption analysis methods for the amount of arsenic, cadmium, copper, mercury and lead contained therein. The results of the analysis are given in the following table. The compositions of the six different alloys are given in Column A thereof and the numbers following the elements show the weight percent of the element in the alloy based upon the total weight of the alloy.

Some of the alloys used in the examples contained trace amounts of other elements, i.e., carbon, manganese, etc. These trace quantities of other elements did not impair the efficiency of the operation of the process.

Alloy of Example 2 was not used to remove the ions from the salt water solution due to the fact that the alloy overreacted with the aqueous salt water solution (pH of 2.0) as indicated by excessive dissolution of the alloy.

The alloys used to extract the ionic metal impurities in this example were easily regenerated by washing the alloys with a dilute aqueous solution of hydrochloric acid containing a small amount of hydrogen peroxide.

TABLE 1.—METALS REMAINING AFTER ALLOY CONTACT

| Example | Column A alloy composition | Water base, all at 25 p.p.m. to start | | | | | Salt water base (30 g. NaCl per liter) 25 p.p.m. to start | | | | |
|---|---|---|---|---|---|---|---|---|---|---|---|
| | | Arsenic p.p.m. | Copper p.p.m. | Cadmium p.p.m. | Lead p.p.m. | Mercury p.p.m. | Arsenic p.p.m. | Copper p.p.m. | Cadmium p.p.m. | Lead p.p.m. | Mercury p.p.m. |
| 1 | Calcium 32.4<br>Silicon 63.1<br>Barium 0.36<br>Iron 4.1 | 2 | <1 | <1 | <1 | <1 | <1 | <1 | <1 | <1 | <1 |
| 2 | Aluminum 20.5<br>Barium 12.4<br>Calcium 10.6<br>Silicon 39.0<br>Iron 17.5 | <1 | <1 | <1 | <1 | <1 | Not treated | | | | |
| 3 | Iron 30.1<br>Titanium 69.8<br>Silicon 0.03 | <1 | <1 | 25 | <1 | <1 | 14 | 13.4 | 25 | 25 | <1 |

TABLE 1.—METALS REMAINING AFTER ALLOY CONTACT —Continued

| Example | Column A alloy composition | | Water base, all at 25 p.p.m. to start | | | | | Salt water base (30 g. NaCl per liter) 25 p.p.m. to start | | | | |
|---|---|---|---|---|---|---|---|---|---|---|---|---|
| | | | Arsenic p.p.m. | Copper p.p.m. | Cadmium p.p.m. | Lead p.p.m. | Mercury p.p.m. | Arsenic p.p.m. | Copper p.p.m. | Cadmium p.p.m. | Lead p.p.m. | Mercury p.p.m. |
| 4 | Iron | 43.0 | 16 | <1 | 25 | 23 | <1 | 16 | 3 | 25 | 23 | <1 |
| | Aluminum | 8.0 | | | | | | | | | | |
| | Silicon | 49.0 | | | | | | | | | | |
| 5 | Iron | 46.0 | <1 | <1 | <1 | <1 | <1 | <1 | <1 | <1 | <1 | <1 |
| | Magnesium | 9.0 | | | | | | | | | | |
| | Silicon | 45.0 | | | | | | | | | | |
| 6 | Iron | 49.9 | 13 | 21 | 25 | 25 | <1 | 20 | 21 | 25 | 22 | 20 |
| | Aluminum | 1.0 | | | | | | | | | | |
| | Silicon | 49.0 | | | | | | | | | | |
| | Calcium | 0.1 | | | | | | | | | | |

NOTE: <1 means that the material contained less than one p.p.m. and as such was undetectable in the solution.

EXAMPLES 7 to 15

For the following examples there was treated a solution containing as impurities ionic chromium, zinc and mercury and having a pH of 5.6.

For Examples 7 to 11, the alloy employed (Alloy A) 46.0 percent by weight iron, 9.0 percent magnesium by weight and 45 percent silicon by weight and had a mesh size of +60 mesh. The amount employed in each instance was 150 grams.

For Examples 12 to 15, the alloy employed (Alloy B) contained about 32–33 weight percent calcium, the balance being essentially silicon. The amount employed in each test was 142 grams and the particle size was +80 mesh.

In all tests the columns employed had 30 mm I.D. and were filled to 150 mm in depth with the alloy.

The results are shown in Table 2 in which there was a magnesium exchange for Alloy A and a calcium exchange for Alloy B.

EXAMPLES 16 to 42

In the following examples a variety of silicon bound alloys were tested for the relative ability to remove cadmium, copper, mercury and zinc from an aqueous solution in each of the metal ions which were initially present in a concentration of 20 ppm. Their concentrations after test are shown in Table 3. Contact time in each instance was for 30 minutes in 100 ml of solution at a solution pH of 4.5. Mechanical shaking was employed. Alloys weights ranged from 0.5 to 1.0 grams and ranged in particle size from −325 to 10 mesh depending on the particular alloy employed.

For Example 33, it is interesting to note that zinc exchanged for copper and mercury.

As a first control there was employed an aluminum-chrome-silicon alloy in which the chrome concentration was 74 percent by weight. This alloy had virtually no effect on iron removal. The same was true, but to a much lesser degree, for an alloy containing 1.0 percent Mn, 13.6 percent Cr, 0.4 percent Si and 83.0 percent Fe. Although some copper and mercury removal occurred essentially no cadmium or zinc were removed.

TABLE 3

| Example | Alloy composition percent by weight | Concentration remaining, p.p.m. | | | |
|---|---|---|---|---|---|
| | | Cd | Cu | Hg | Zn |
| 16 | 8.9 Mg, 45.2 Si, 46.0 Fe | 9.9 | 6.1 | 7.8 | 8.2 |
| 17 | 63.0 Mg, 36.8 Si | 0.3 | 0.3 | 0.1 | 0.4 |
| 18 | 5.7 Mg, 45.7 Si, 0.7 Mn, 0.6 Ce, 1.0 Ca, 44.5 Fe. | 11.1 | 2.1 | 4.1 | 7.8 |
| 19 | 9.2 Mg, 45.1 Si, 0.6 Mn, 0.6 Ce, 1.2 Ca, 42.0 Fe. | 3.1 | 0.5 | 1.3 | 0.6 |
| 20 | 16.6 Ca, 16.7 Ba, 57.0 Si, 8.5 Fe | 0.1 | 0.1 | 0.1 | 0.05 |
| 21 | 32.4 Ca, 63.1 Si, 4.1 Fe, 0.4 Ba | 18.5 | 7.8 | 1.2 | 16.5 |
| 22 | 47.9 V, 6.5 Si, 0.8 Al, 0.5 C, 43.3 Fe | 20.0 | 17.5 | 1.4 | 20.0 |
| 23 | 25.9 Ti, 3.2 Al, 3.1 Si, 67.0 Fe | 19.8 | 17.9 | 16.0 | 20.0 |
| 24 | 68.2 Mo, 2.3 Si, 0.6 C, 0.5 Cu, 27.6 Fe. | 19.1 | 2.2 | 0.1 | 13.6 |
| 25 | 0.5 C, 0.8 Mn, 1.1 Cr, 0.3 Si, 96.0 Fe. | 19.0 | 3.1 | 0.6 | 10.8 |
| 26 | 1.0 Mn, 0.4 C, 0.3 Si, 98.0 Fe | 18.6 | 3.2 | 0.6 | 10.2 |
| 27 | 0.4 Si, 99.5 Mn | 6.9 | 0.2 | 0.3 | 1.0 |
| 28 | 1.3 C, 66.3 Mn, 19.2 Si, 13.0 Fe | 19.9 | 16.9 | 0.1 | 19.5 |
| 29 | 55.1 Mn, 26.6 Si, 15.5 Fe | 20.0 | 20.0 | 12.7 | 19.7 |
| 30 | 61.0 Mn, 29.2 Si, 7.4 Fe | 19.9 | 19.9 | 5.6 | 19.4 |
| 31 | 50.1 Mn, 49.2 Si | 19.9 | 18.1 | 13.4 | 19.7 |
| 32 | 49.0 Al, 50.0 Si | 19.9 | 19.8 | 5.3 | 19.5 |
| 33 | 50.1 Cu, 44.8 Al, 4.7 Zn, 0.3 Si | 19.6 | 6.1 | 1.7 | 44.3 |
| 34 | 0.3 Si, 99.5 Fe | 16.2 | 0.3 | 0.15 | 1.7 |
| 35 | 3.2 Si, 96.0 Fe | 16.8 | 2.3 | 0.41 | 6.9 |
| 36 | 1.0 Al, 49.0 Si, 49.0 Fe | 19.7 | 19.6 | 16.8 | 20.0 |
| 37 | 8.0 Al, 49.0 Si, 43.0 Fe | 19.9 | 18.9 | 6.7 | 20.0 |
| 38 | 4.2 Cr, 1.9 V, 5.2 Mo, 6.3 W, 0.8 C, 80.0 Fe, 0.3 Si. | 17.9 | 1.9 | 0.42 | 10.3 |
| 39 | 5.2 Cr, 0.6 Mo, 0.4 Si, 0.5 Mn, 93.0 Fe. | 19.4 | 10.3 | 3.10 | 17.6 |
| 40 | 69.8 Ti, 29.0 Fe, <0.2 Si | 16.9 | 0.7 | 0.28 | 6.5 |
| 41 | 45.6 Ti, 53.8 Si | 20.0 | 18.3 | 16.0 | 20.0 |
| 42 | 95.0 Mg, 3.0 Al, 1.0 Zn, 0.5 Mn, Si 0.01. | 9.6 | <0.5 | <0.1 | 1.5 |

TABLE 2

| | Eluate volume cut (ml.) | Flow rate (ml./min.) | Cr (VI) (p.p.m.) | Percent removal | Zn (II) (p.p.m.) | Percent removal | Hg (II) (p.p.b.) | Percent removal | Mg (II) (p.p.m.) | Ca (II) (p.p.m.) |
|---|---|---|---|---|---|---|---|---|---|---|
| Parent solution composition. | | | 7.6 | | 9.9 | | 9,9000 | | 0.01 | 0.10 |
| Ex. 7, alloy A | 400–500 | 10 | 5.4 | 29 | 0.01 | 99 | 2.6 | 99.9 | 48 | |
| Ex. 8, alloy A | 500–550 | 1 hr., static | 2.3 | 70 | 0.01 | 99 | 2.4 | 99.9 | 51 | |
| Ex. 9, alloy A | 900–1,000 | 2.5 | 5.3 | 30 | 0.01 | 99 | 0.8 | 99.9 | 49 | |
| Ex. 10, alloy A | 1,000–1,050 | Overnite, static | <0.5 | >93 | 0.01 | 99 | 2.0 | 99.9 | 38 | |
| Ex. 11, alloy A | pH=3.0, separate. | 14 | 2.6 | 66 | 0.01 | 99 | 4.8 | 99.9 | 54 | |
| Ex. 12, alloy B | 400–500 | 10 | 6.3 | 17 | 0.01 | 99 | 10.8 | 99.9 | | 114 |
| Ex. 13, alloy B | 500–550 | 1 hr., static | 6.0 | 21 | 0.01 | 99 | 47.2 | 99.5 | | 104 |
| Ex. 14, alloy B | 900–1,000 | 2.5 | 7.2 | 5 | 0.01 | 99 | 3.6 | 99.9 | | 69 |
| Ex. 15, alloy B | 1,000–1,050 | Overnite, static | 3.5 | 54 | 0.01 | 99 | 75.6 | 99.3 | | 124 |

What is claimed is:

1. A process for the selective separation of ionic metallic species from aqueous solutions which comprises:
   a. contacting the aqueous solution with a sufficient amount of at least one solid particulate silicon-metal alloy containing up to about 65 percent by weight silicon, said alloy having a net electrochemical potential greater than the metallic species to be separated from the aqueous solution and less than the electrochemical potential of the metal species to remain in solution for a period of time until the metallic species having the lower electrochemical potential is separated from said solution; and
   b. removing the separated metallic species from said aqueous solution.

2. A process as claimed in claim 1 in which the silicon-metal alloy contains barium, lithium, calcium, sodium, potassium, magnesium, cerium, lanthanum, titanium, aluminum, vanadium, manganese, zinc, chromium, iron, cobalt, tungsten, nickel, molybdenum, copper, zirconium, niobium, tin, and the like.

3. A process as claimed in claim 1 in which silicon is present in the alloy in an amount of from about 1 to about 65 percent by weight based on the total weight of the alloy.

4. A process as claimed in claim 2 in which silicon is present in the alloy in an amount of from about 1 to about 65 percent by weight based on the total weight of the alloy.

5. A process as claimed in claim 1 in which silicon is present in the alloy in an amount of from about 35 to about 65 percent by weight based on the total weight of the alloy.

6. A process as claimed in claim 2 in which silicon is present in the alloy in an amount of from about 35 to about 65 percent by weight based on the total weight of the alloy.

7. A process as claimed in claim 1 in which the silicon-metal alloy has the following composition given in weight percent: calcium about 32.4, silicon about 63.1, barium about 0.36, and iron about 4.1.

8. A process as claimed in claim 1 in which the silicon-metal alloy has the following composition given in weight percent: aluminum about 20.5, barium about 12.4, calcium about 10.6, silicon about 39.0, and iron about 17.5.

9. A process as claimed in claim 1 in which the silicon-metal alloy has the following composition given in weight percent: iron about 30.1, titanium about 69.8, and silicon about 0.03.

10. A process as claimed in claim 1 in which the silicon-metal alloy has the following composition given in weight percent: iron about 43.0, aluminum about 8.0, and silicon about 49.0.

11. A process as claimed in claim 1 in which the silicon-metal alloy has the following compositon given in weight percent: iron about 46.0, silicon about 45.0, and magnesium about 9.0.

12. A process as claimed in claim 1 in which the silicon-metal alloy has the following composition given in weight percent: iron about 49.9, aluminum about 1.0, silicon about 49.0, and calcium about 0.1.

13. A process as claimed in claim 1 in which the silicon-metal alloy has the following composition given in weight percent: magnesium about 63.0, silicon about 36.8.

14. A process as claimed in claim 1 in which the silicon-metal alloy has the following composition given in weight percent: vanadium about 47.9, silicon about 6.5, iron about 43.0, aluminum about 0.8, and carbon about 0.5.

15. A process as claimed in claim 1 in which the silicon-metal alloy has the following composition given in weight percent: magnesium about 5.7, silicon 45.7, manganese about 0.7, cerium about 0.6, calcium about 1.0, and iron about 44.5.

16. A process as claimed in claim 1 in which the silicon-metal alloy has the following composition given in weight percent: manganese about 1.0, carbon about 0.4, silicon about 0.3, and iron about 98.0.

17. A process as claimed in claim 1 in which the silicon-metal alloy has the following composition given in weight percent: magnesium about 9.2, silicon about 45.1, manganese about 0.6, cerium about 0.6, calcium about 1.2, and iron about 42.0.

18. A process as claimed in claim 1 in which the silicon-metal alloy has the following composition given in weight percent: calcium about 16.6, barium about 16.7, silicon about 57.0, and iron about 8.5.

19. A process as claimed in claim 1 in which the silicon-metal alloy has the following composition given in weight percent: copper about 50.1, aluminum about 44.8, zinc about 4.7, and silicon about 0.3.

20. A process as claimed in claim 1 in which the silicon-metal alloy has the following composition given in weight percent: iron about 96.0, silicon about 0.3, chromium about 1.1, manganese about 0.8, and carbon about 0.5.

21. A process as claimed in claim 1 in which the silicon-metal alloy has the following composition given in weight percent: molybdenum about 68.2, silicon about 2.3, carbon about 0.6, copper about 0.5, and iron about 27.6.

22. A process as claimed in claim 1 in which the silicon-metal alloy has the following composition given in weight percent: manganese about 99.5, and silicon about 0.4.

23. A process as claimed in claim 1 in which the silicon-metal alloy has the following composition given in weight percent: iron about 96.0, and silicon about 3.2.

24. A process as claimed in claim 1 in which the silicon-metal alloy has the following composition given in weight percent: chromium about 4.2, vanadium about 1.9, molybdenum about 5.2, tungstan about 6.3, carbon about 0.8, iron about 80.0, and silicon about 0.3.

25. A process as claimed in claim 1 in which the silicon-metal alloy has the following composition given in weight percent: magnesium about 95.0, aluminum about 3.0, zinc about 1.0, manganese about 0.5, silicon about 0.01.

26. A process as claimed in claim 1 in which the silicon-metal alloy has the following composition given in weight percent: carbon about 1.3, iron about 13.0, silicon about 19.2, and manganese about 66.3.

27. A process as claimed in claim 1 in which the extracted ionic metallic impurities are electrochemically bonded to the silicon-metal alloy.

28. The process of claim 1 wherein said silicon-metal alloy has an electrochemical potential ranging from about 0.35 to about 2.5 volts.

29. The process of claim 27 wherein the alloys having the ionic metallic impurities electrochemically bonded thereto are regenerated by oxidizing the impurities therefrom.

30. The process of claim 27 wherein the alloys having the ionic metallic impurities bonded thereto are oxidized by washing the alloy particles in an aqueous acid solution until the impurities bonded thereto are removed from the alloy.

31. The process of claim 30 wherein the acid is a mineral acid.

32. The process of claim 30 wherein the acid is hydrochloric acid.

33. The process of claim 27 wherein the alloys having the ionic metallic impurities electrochemically bonded thereto are regenerated for reuse in the process by forming a liquid electrochemical cell, utilizing the alloy to be regenerated as the anode thereof and applying an electrical potential to the cell to regenerate the alloy.

34. A process for removing ionic metallic impurities from aqueous solutions thereof comprising, contacting an aqueous solution containing ionic metallic impurities with a solid particulate silicon-metal alloy, said alloy containing up to about 65.0 weight percent of silicon based upon the total weight of the alloy and the remainder of said alloy being composed of a metal selected from the group composed of titanium, magnesium, aluminum, iron, calcium, barium and mixtures thereof; said alloy having an electrochemical potential greater than the electrochemical potential of the ionic metallic impurities to be separated when they are in the metallic state and substantially inert with respect to water.

35. A process for the selective separation of ionic metallic species from aqueous solutions which comprises:
   a. contacting the aqueous solution with a sufficient amount of a fast solid particulate silicon-metal alloy containing up to about 65 percent by weight silicon, said alloy having a net electrochemical potential greater than the metallic species to be separated from the aqueous solution and less than the electrochemical potential of the metal species to remain in solution for a period of time until the metallic species having the lower electrochemical potential is separated from said solution;
   b. removing the separated metallic species from said aqueous solution;
   c. contacting the resultant aqueous solution with at least one additive solid particulate silicon-metal alloy having a greater electrochemical potential than the silicon-metal alloy employed in step (a) to separate additional metallic species from said solution, said silicon-metal alloy having a greater electrochemical potential than the metallic species to be separated when in their free metallic state; and
   d. removing the additionally separated metallic species from said resultant aqueous solution.

* * * * *

PO-1050
(5/69)

UNITED STATES PATENT OFFICE
CERTIFICATE OF CORRECTION

Patent No. 3,766,036  Dated October 16, 1973

Inventor(s) James P. McKaveney

It is certified that error appears in the above-identified patent and that said Letters Patent are hereby corrected as shown below:

Column 2, line 21, "of" should read -- or --.

Column 3, line 43, "by" should read -- to --.

Column 8, line 20, "iron" should read -- ion --.

Column 9, line 46, "12,4" should read -- 12.4 --.

Table 2 reads

" TABLE 2

| | Eluate volume cut (ml.) | Flow rate (ml./min.) | Cr (VI) (p.p.m.) | Percent removal | Zn (II) (p.p.m.) | Percent removal | Hg (II) (p.p.b.) | Percent removal | Mg (II) (p.p.m.) | Ca (II) (p.p.m.) |
|---|---|---|---|---|---|---|---|---|---|---|
| Parent solution composition. | | | 7.6 | | 9.9 | | 9,000 | | 0.01 | 0.10 |
| Ex. 7, alloy A | 400–500 | 10 | 5.4 | 29 | 0.01 | 99 | 2.6 | 99.9 | 48 | |
| Ex. 8, alloy A | 500–550 | 1 hr., static | 2.3 | 70 | 0.01 | 99 | 2.4 | 99.9 | 51 | |
| Ex. 9, alloy A | 900–1,000 | 2.5 | 5.3 | 30 | 0.01 | 99 | 0.8 | 99.9 | 40 | |
| Ex. 10, alloy A | 1,000–1,050 | Overnite, static | <0.5 | >93 | 0.01 | 99 | 2.0 | 99.9 | 38 | |
| Ex. 11, alloy A | pH = 3.0, separate. | 14 | 2.6 | 66 | 0.01 | 99 | 4.8 | 99.9 | 54 | |
| Ex. 12, alloy B | 400–500 | 10 | 6.3 | 17 | 0.01 | 99 | 10.8 | 99.9 | 114 | |
| Ex. 13, alloy B | 500–550 | 1 hr., static | 6.0 | 21 | 0.01 | 99 | 47.2 | 99.5 | 104 | |
| Ex. 14, alloy B | 900–1,000 | 2.5 | 7.2 | 5 | 0.01 | 99 | 3.6 | 99.9 | 69 | |
| Ex. 15, alloy B | 1,000–1,050 | Overnite, static | 3.5 | 54 | 0.01 | 99 | 75.6 | 99.3 | 124 | | should read

-- TABLE 2

| | Eluate volume cut (ml.) | Flow rate (ml./min.) | Cr (VI) (p.p.m.) | Percent removal | Zn (II) (p.p.m.) | Percent removal | Hg (II) (p.p.m.) | Percent removal | Mg (II) (p.p.m.) | Ca (II) (p.p.m.) |
|---|---|---|---|---|---|---|---|---|---|---|
| Parent solution composition. | | | 7.6 | | 9.9 | | 9,000 | | 0.01 | 0.10 |
| Ex. 7, alloy A | 400–500 | 10 | 5.4 | 29 | 0.01 | 99 | 2.6 | 99.9 | 48 | |
| Ex. 8, alloy A | 500–550 | 1 hr., static | 2.3 | 70 | 0.01 | 99 | 2.4 | 99.9 | 51 | |
| Ex. 9, alloy A | 900–1,000 | 2.5 | 5.3 | 30 | 0.01 | 99 | 0.8 | 99.9 | 40 | |
| Ex. 10, alloy A | 1,000–1,050 | Overnite, static | <0.5 | >93 | 0.01 | 99 | 2.0 | 99.9 | 38 | |
| Ex. 11, alloy A | pH = 3.0, separate. | 14 | 2.6 | 66 | 0.01 | 99 | 4.8 | 99.9 | | 104 |
| Ex. 12, alloy B | 400–500 | 10 | 6.3 | 17 | 0.01 | 99 | 10.8 | 99.9 | | 114 |
| Ex. 13, alloy B | 500–550 | 1 hr., static | 6.0 | 21 | 0.01 | 99 | 47.2 | 99.5 | | 69 |
| Ex. 14, alloy B | 900–1,000 | 2.5 | 7.2 | 5 | 0.01 | 99 | 3.6 | 99.9 | | 124 |
| Ex. 15, alloy B | 1,000–1,050 | Overnite, static | 3.5 | 54 | 0.01 | 99 | 75.6 | 99.3 | | |

--

Signed and sealed this 26th day of March 1974.

(SEAL)
Attest:

EDWARD M. FLETCHER, JR.
Attesting Officer

C. MARSHALL DANN
Commissioner of Patents